(12) United States Patent
Thawani et al.

(10) Patent No.: US 8,998,587 B2
(45) Date of Patent: Apr. 7, 2015

(54) BLOWER MOTOR COOLING TUBE NOISE SUPPRESSOR FOR TICKING/CHIRPING

(75) Inventors: Prakash T. Thawani, Bloomfield Hills, MI (US); Stephen Sinadinos, Commerce Township, MI (US)

(73) Assignee: DENSO International America, Inc., Southfield, MI (US)

( * ) Notice: Subject to any disclaimer, the term of this patent is extended or adjusted under 35 U.S.C. 154(b) by 530 days.

(21) Appl. No.: 13/328,020

(22) Filed: Dec. 16, 2011

(65) Prior Publication Data

US 2013/0156554 A1 Jun. 20, 2013

(51) Int. Cl.
*F04D 25/08* (2006.01)
*B60H 1/00* (2006.01)

(52) U.S. Cl.
CPC .......... *F04D 25/082* (2013.01); *B60H 1/00521* (2013.01); *B60H 2001/006* (2013.01)

(58) Field of Classification Search
CPC .................. F04D 25/082; B60H 2001/006
USPC ................... 417/369, 370; 181/264, 269, 272
See application file for complete search history.

(56) References Cited

U.S. PATENT DOCUMENTS 5,521,340 A 5/1996 Thawani et al.
6,637,546 B1 * 10/2003 Wang ............................ 181/264
6,802,699 B2 * 10/2004 Mikami et al. ................ 417/369
2003/0210981 A1 * 11/2003 Kim ............................ 415/182.1
2011/0189033 A1 * 8/2011 Czulak et al. ................. 417/369

FOREIGN PATENT DOCUMENTS

| JP | 07-015482 | 3/1995 |
| JP | 07-028707 | 5/1995 |
| JP | 2003-080922 | 3/2003 |
| JP | 2004-092594 | 3/2004 |
| JP | 2004-237838 | 8/2004 |
| JP | 2006-298180 | 11/2006 |
| JP | 2009-202692 | 9/2009 |

OTHER PUBLICATIONS

Office action dated Feb. 18, 2014 in corresponding Japanese Application No. 2012-172230.

* cited by examiner

*Primary Examiner* — Charles Freay
(74) *Attorney, Agent, or Firm* — Harness, Dickey & Pierce, P.L.C.

(57) ABSTRACT

A blower unit for a vehicle including a fan, a motor, a scroll case, a cooling chamber, a first partition, and a second partition. The fan is configured to generate airflow. The motor is connected to the fan. The scroll case accommodates the fan. The cooling chamber is connected to the scroll case and defines a cooling path for guiding airflow from the fan to the motor. The first partition is arranged in the cooling path. The second partition is arranged in the cooling path spaced apart from the first partition.

23 Claims, 10 Drawing Sheets

BLOWER MOTOR COOLING TUBE NOISE SUPPRESSOR FOR TICKING/CHIRPING

FIELD

The present disclosure relates to a scroll type blower unit for a vehicle.

BACKGROUND

A blower unit for a vehicle inherently generates noise. Such noise may contain undesirable high frequency noise. When the blower unit is running at low speed, the undesirable high frequency noise may be readily perceived by a person in a vehicle cabin.

SUMMARY

This section provides a general summary of the disclosure, and is not a comprehensive disclosure of its full scope or all of its features.

The present teachings provide for a blower unit for a vehicle. The blower unit includes a fan, a motor, a scroll case, a cooling path, a first surface, and a second surface. The fan is configured to generate air flow. The motor is connected to the fan. The scroll case accommodates the fan. The cooling path is connected to the scroll case and guides a part of the air flow from the fan to the motor. The first surface is accommodated in the cooling path and is generally perpendicular to the part of the airflow directed to the motor. The second surface is accommodated in the cooling path, and is substantially parallel to the first surface. The first surface and the second surface at least partially overlap each other in a direction of the airflow directed to the motor. The first and the second surfaces define a first gap therebetween.

The present teachings also provide for a blower unit for a vehicle that includes a fan, a motor, a scroll case, a cooling chamber, a first partition and a second partition. The fan is configured to generate airflow. The motor is connected to the fan. The scroll case accommodates the fan. The cooling chamber is connected to the scroll case and defines a cooling path for guiding airflow from the fan to the motor. The first partition is arranged in the cooling path. The second partition is arranged in the cooling path spaced apart from the first partition.

The present teachings further provide for a blower unit for a vehicle that includes a fan, a motor, a scroll case, a cooling chamber, a sloped surface, a first partition, and a second partition. The fan is configured to generate airflow. The motor is connected to the fan and seated within a motor housing. The scroll case accommodates the fan. The cooling chamber is connected to the scroll case and defines a cooling path for guiding airflow from the fan to the motor. The sloped surface of the cooling chamber extends between an outer peripheral portion of the scroll case to an edge of the motor housing. The first partition is arranged in the cooling path and extends from the scroll case. The second partition is arranged in the cooling path spaced apart from the first partition and extends from one of the scroll case or the sloped surface.

Further areas of applicability will become apparent from the description provided herein. It should be understood that the description and specific examples are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Example embodiments will now be described more fully with reference to the accompanying drawings.

Figure 1:
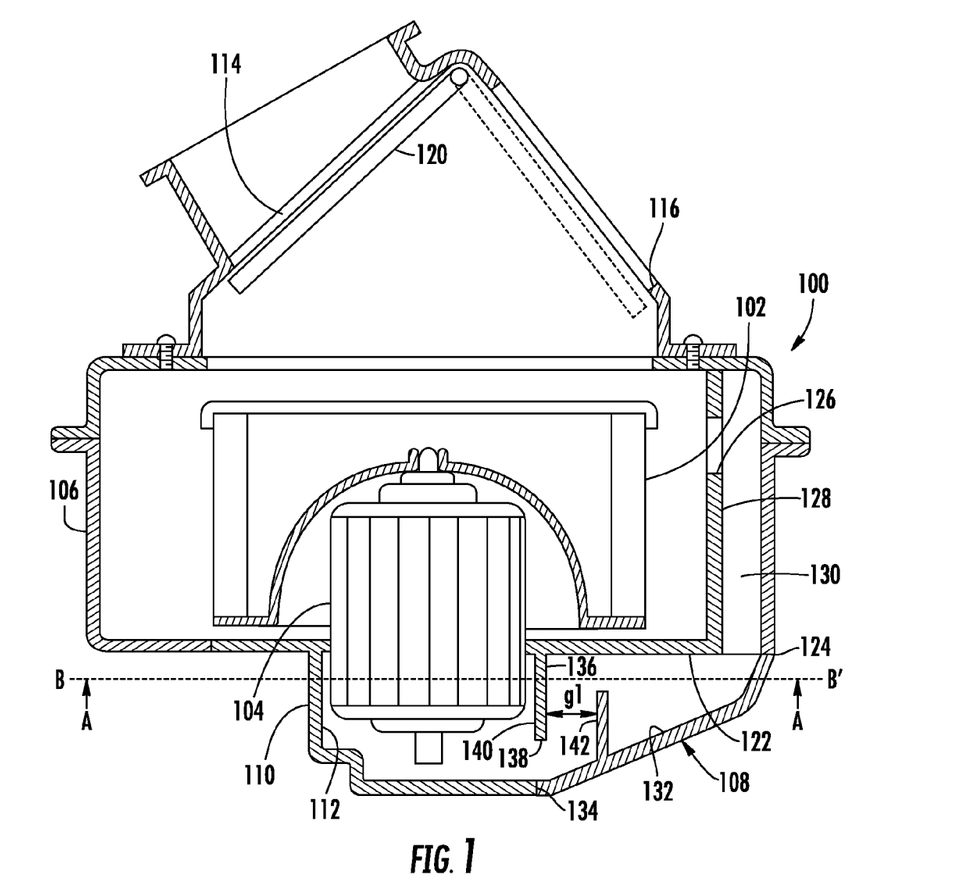
FIG. 1 is a cross sectional view of a blower unit according to a first embodiment.

FIG. 1 is a cross sectional view of a blower unit 100 for a vehicle according to a first embodiment of the present teachings. The blower unit 100 comprises a fan 102, a motor 104, a scroll case 106, and a cooling chamber defining a cooling path 108. The fan 102 is a centrifugal multi-blade type fan. The fan 102 is connected to the motor 104. The motor 104 is a brush type motor. The brush type motor comprises a brush and a commutator. The fan 102 creates airflow when rotated by the motor 104.

The motor 104 is accommodated in a motor housing 110. The motor housing 110 defines an inner cylindrical surface 112. The scroll case 106 accommodates the fan 102. The scroll case 106 further defines a fresh air inlet 114, a recirculation air inlet 116, and an air outlet 118 (not shown in FIG. 1, see FIGS. 4 and 5). The blower unit 100 intakes air from the fresh air inlet 114 or the recirculation air inlet 116. In this embodiment, the fresh air inlet 114 and the recirculation air inlet 116 are alternatively opened and closed by a door 120.

The cooling path 108 is connected to the scroll case 106 at a bottom surface 122 of the scroll case 106. The cooling path 108 extends from an outer peripheral portion 124 of the scroll case 106 to the motor 104. The scroll case 106 has an aperture 126 on its side surface 128. A part of the airflow is directed into that aperture 126. An upstream side of the cooling path 108 communicates with a space 130 located at a downstream side of the aperture 126. A downstream side of the cooling path 108 communicates with the inner side of the motor housing 110. Thus, the cooling path 108 guides a part of the airflow to the motor 104. The cooling path 108 defines a slope 132. The slope 132 declines from the outer peripheral portion 124 of the scroll case 106 to an edge 134 of the motor housing 110. The airflow directed to the motor 104 goes through the motor housing 110 and enters the scroll case 106 again.

A first flat surface 136 is accommodated in the cooling path 108. The first flat surface 136 in this embodiment is generally perpendicular to a flow direction of the part of the airflow directed to the motor 104, but the angle of the first flat surface 136 may be inclined as well. In this embodiment, the first flat surface 136 forms a part of the motor housing 110. The first flat surface 136 is provided on one side of a partition or wall 138 (depicted in FIG. 2). The wall 138 provides a curved surface 140 on the other side of the first flat surface 136. In another embodiment, the first flat surface 136 does not need to be a part of the scroll case 106 or cooling path 108.

A second flat surface 142 of a second partition or wall is accommodated in the cooling path. The second flat surface 142 is substantially parallel to the first flat surface 136. The second flat surface 142 protrudes from the slope 132 into the cooling path 108. The first flat surface 136 and the second flat surface 142 at least partially overlap each other in a direction of the airflow. There is a first gap (g1) between the first flat surface 136 and the second flat surface 142, as illustrated in FIG. 1 for example.

Figure 2:
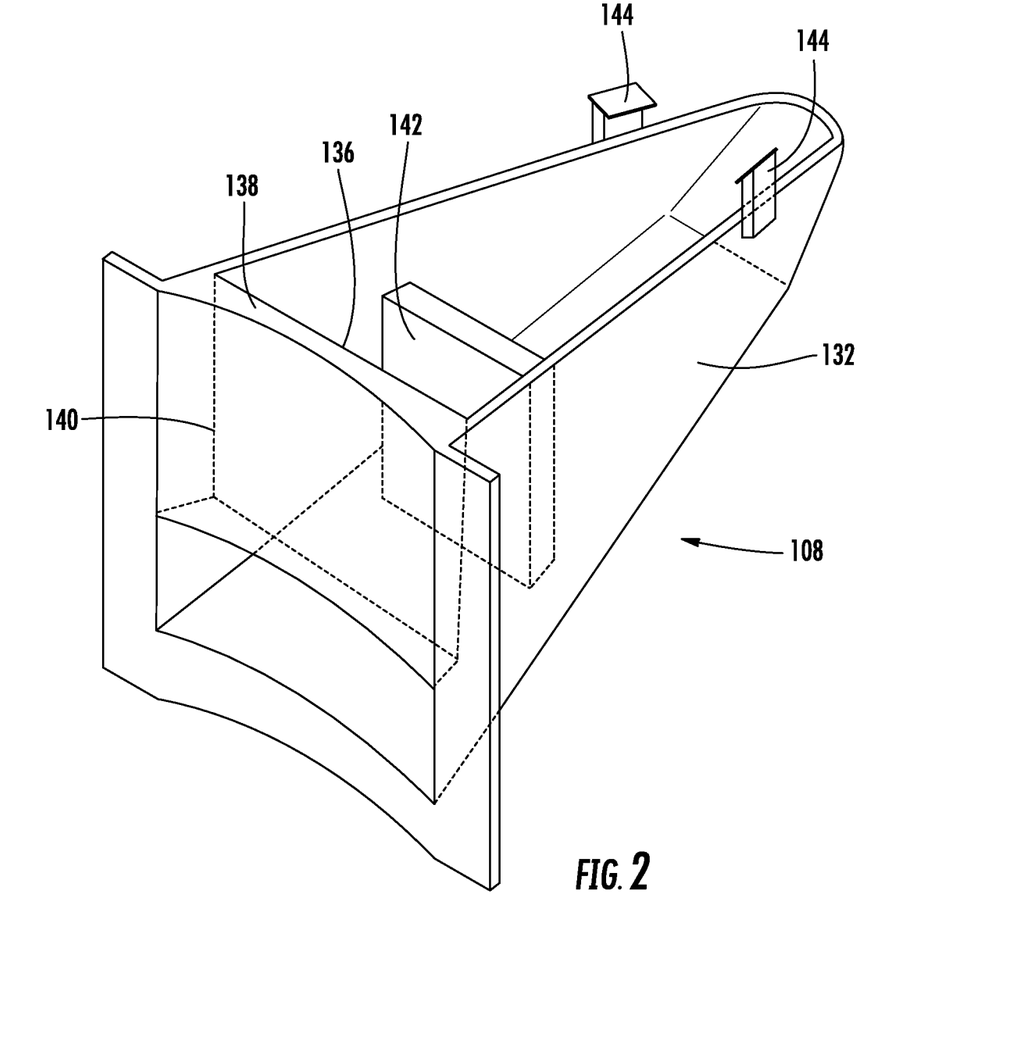
FIG. 2 is an isometric view of a cooling path according to the first embodiment.
Figure 3:
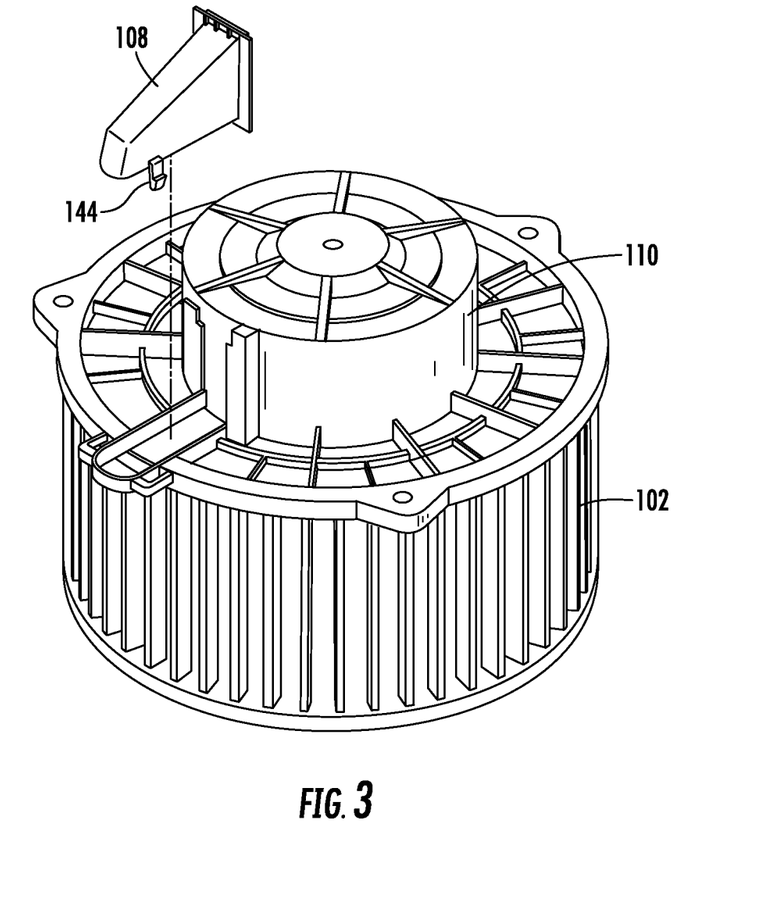
FIG. 3 is an isometric view of the cooling path, a fan, and a motor housing of the first embodiment.
Figure 4:
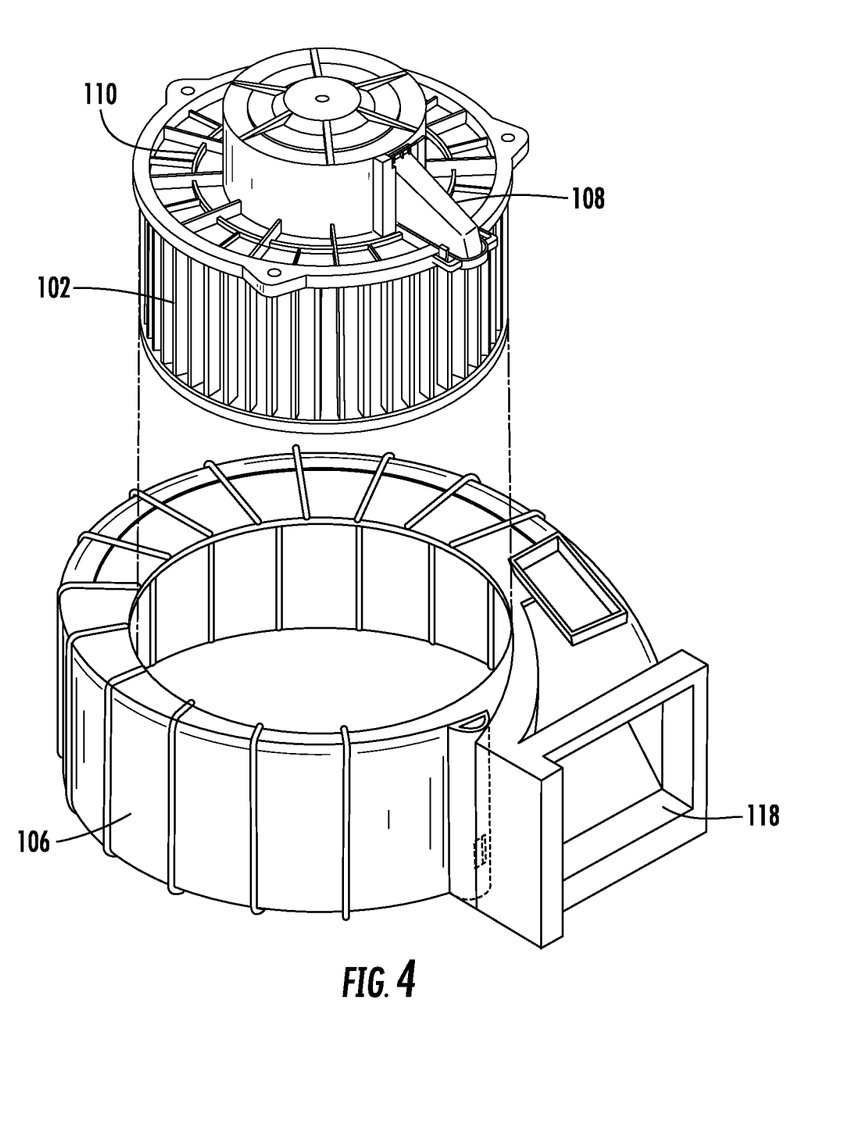
FIG. 4 is an isometric view of a fan and motor housing assembly, and a scroll case of the first embodiment.
Figure 5:
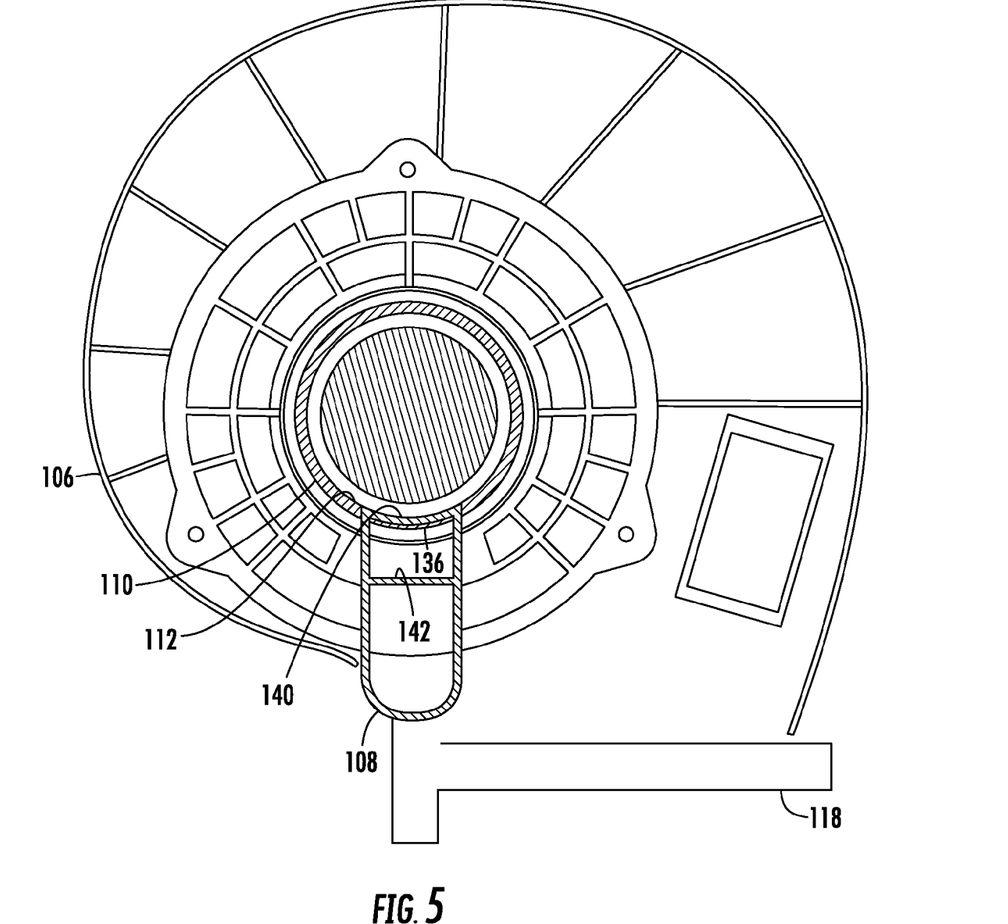
FIG. 5 is a cross sectional view of the blower unit of the first embodiment taken along line B-B' of FIG. 1 in the direction of arrows A.

FIG. 2 further depicts a perspective view of the cooling path 108 in the first embodiment. In this embodiment, the cooling path 108 is a separate part from the scroll case 106. FIGS. 3 and 4 are isometric views of the cooling path 108, the fan 102, the motor housing 110, and the scroll case 106 in the first embodiment. The cooling path 108 is attached to the motor housing 110 and scroll case 106 by clamps 144. FIG. 5 is a cross sectional view of the blower unit 100 along dashed line B-B' viewing from the direction of arrow A depicted in FIG. 1. The curved surface 140 corresponds to the inner cylindrical surface 112.

Figure 6:
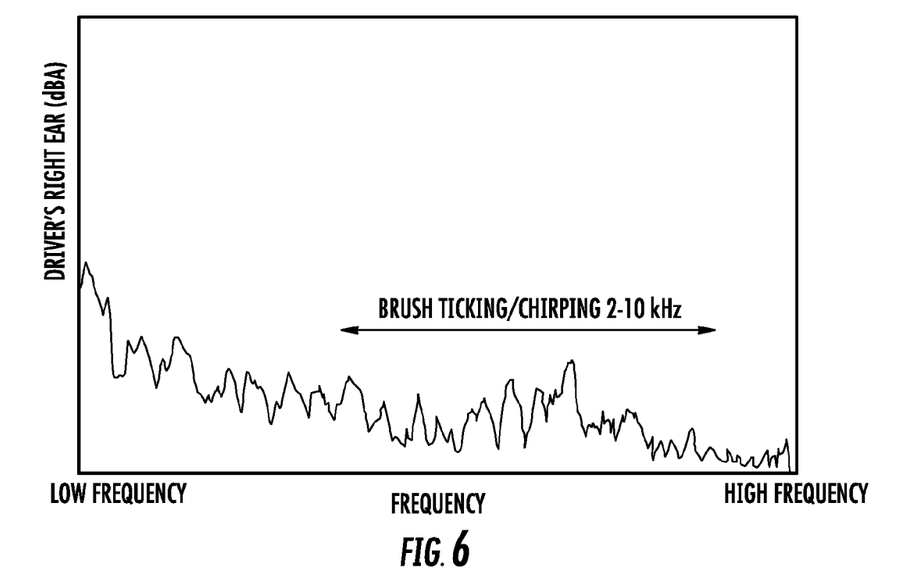
FIG. 6 is a graph showing noise level created by a brush motor at low speed.
Figure 7:
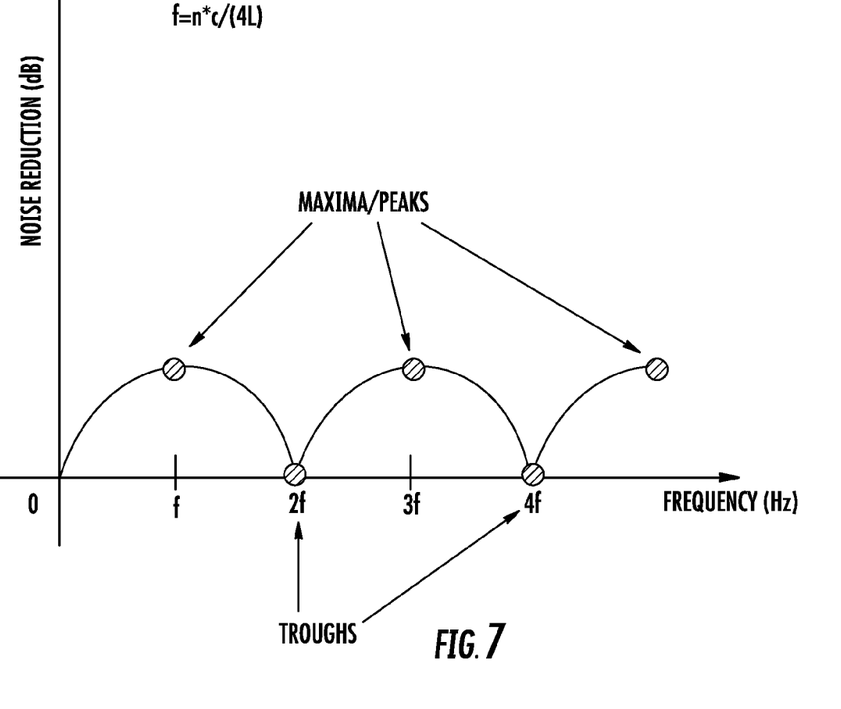
FIG. 7 is a graph showing noise reduction effect by a certain length of silencing chamber.

FIG. 6 is a graph showing noise level created by a brush motor at low speed. The brush motor typically makes noise at 2 to 10 kHz high frequency bands. The driver may easily perceive such high frequency band noise. In this disclosure, the first flat surface 136 and the second flat surface 142 cooperatively provide a narrow noise reduction chamber, gap (g1), in the cooling path 108. As shown in FIG. 7, the noise reduction effect relates to the chamber length. The length of the chamber (L) is defined by the distance between the flat surfaces. The noise reduction effect has Maximum/peaks calculated by $n*c/(4L)$, and Pockets/troughs appear at $n*c/(2L)$ between the Maxima/peaks, where n is an integer, c is velocity of sound, and L is length of the chamber.

It is preferable that the cooling path 108 defines a narrow chamber gap (g1), small enough to preclude the above Pockets/troughs from an assumed noise range. For example, if the chamber gap (g1) is set to be less than 1.8 cm, the Pockets/troughs will not appear until about 9 kHz. Thus, the high frequency noise created by brush motor noise may be effectively suppressed by the narrow chamber gap (g1) at all the Maxima/peaks.

Second Embodiment

Figure 8:
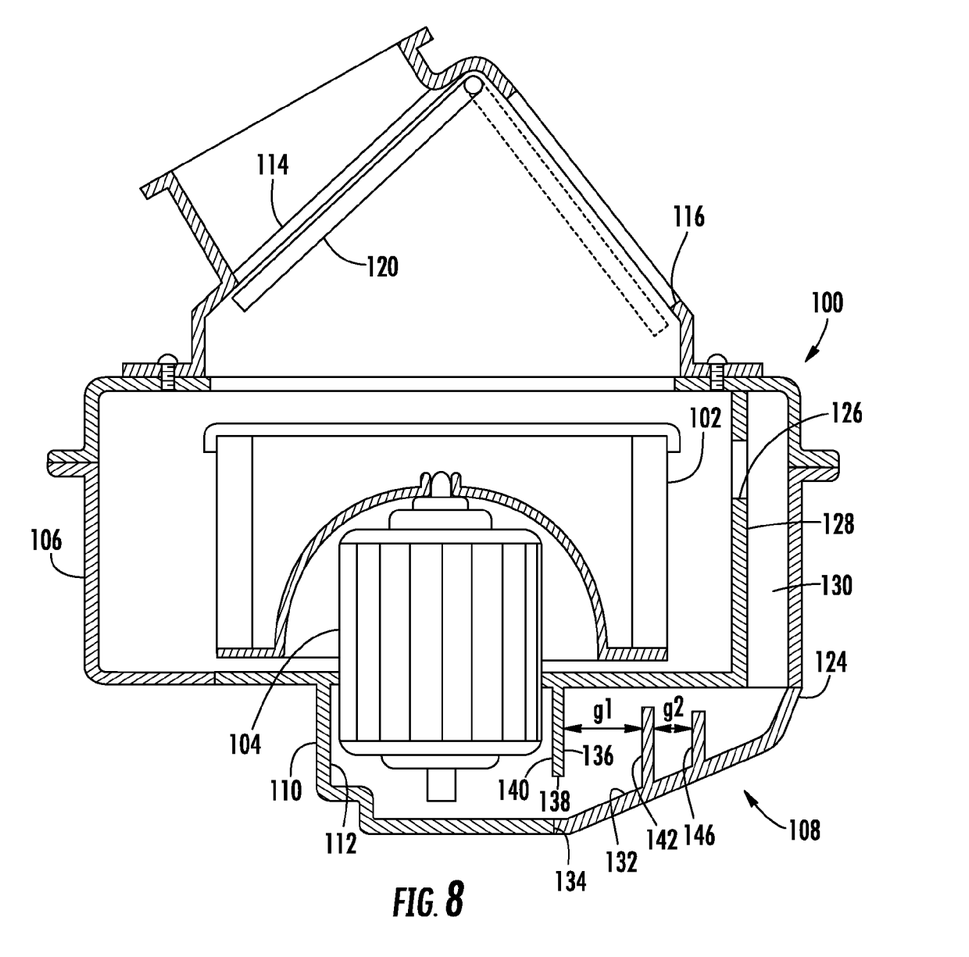
FIG. 8 is a cross sectional view of a blower unit for a vehicle according to a second embodiment of the present teachings.

FIG. 8 is a cross sectional view of a blower unit 100 in the second embodiment. In the second embodiment, the blower unit 100 for a vehicle further includes a third flat surface 146 or a third partition or wall. The third flat surface 146 is accommodated in the cooling path 108, and is substantially parallel to the second flat surface 142. The second flat surface 142 and the third flat surface 146 at least partially overlap each other, and define a second gap (g2) between them. The distance between the first flat surface and the second flat surface (the first gap g1) is different from the distance between the second flat surface and the third flat surface (the second gap g2). More specifically, in this embodiment, the first gap g1 is larger than the second gap g2. In this embodiment, the first flat surface 136 is provided by the outer wall of the motor housing 110.

Figure 9:
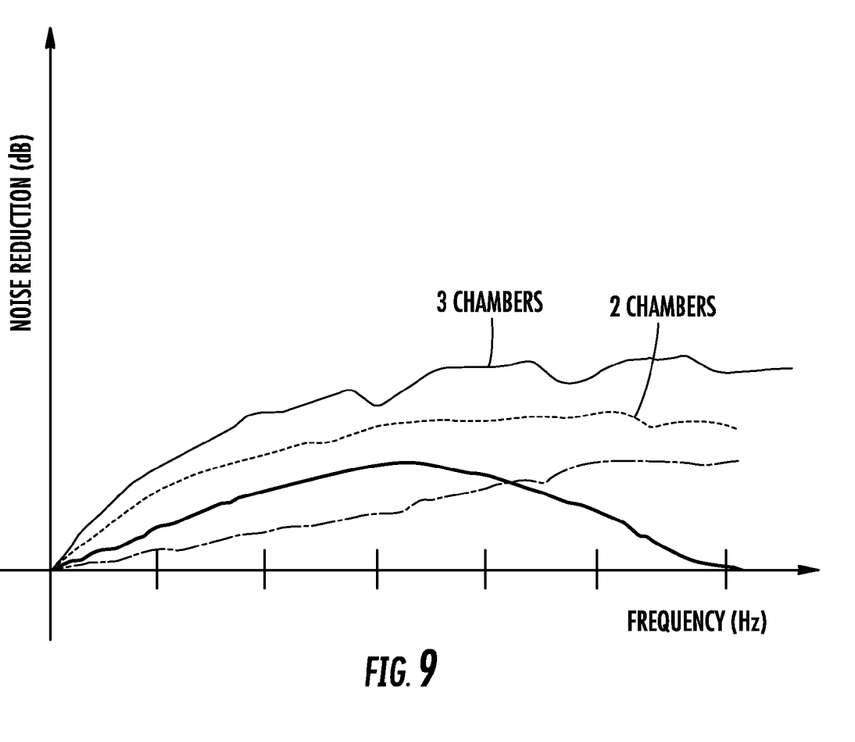
FIG. 9 is a graph showing noise reduction effect by multiple lengths of multiple silencing chambers.

FIG. 9 shows noise reduction effect by multiple lengths of multiple chambers. Like the configuration depicted in FIG. 8, multiple chambers will provide a broad band frequency noise reduction effect.

Figure 10:
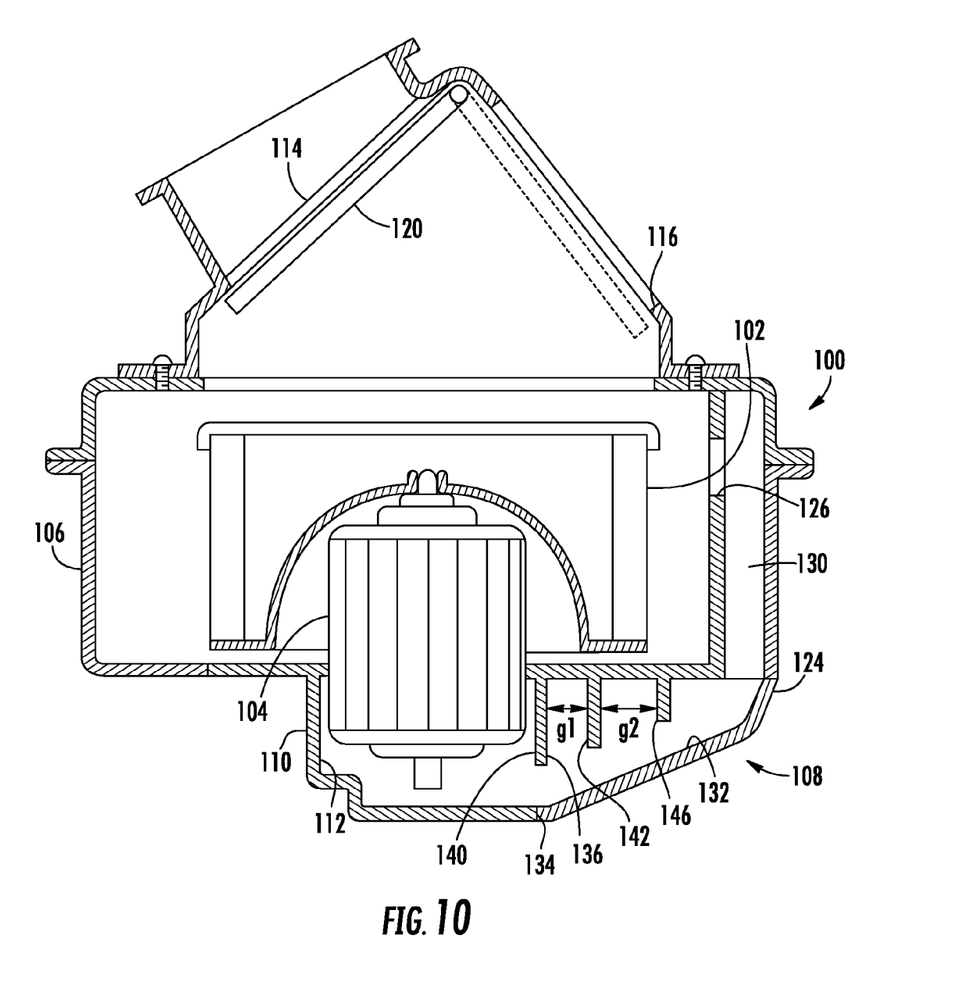
FIG. 10 is a cross sectional view of a blower unit for a vehicle according to a third embodiment of the present teachings.

FIG. 10 is a cross sectional view of a blower unit 100 according to a third embodiment of the present teachings. In this third embodiment, the second flat surface 142 and the third flat surface 146 protrude from the bottom surface of the scroll case 106. In this embodiment, the first gap g1 is smaller than the second gap g2.

Figure 11:
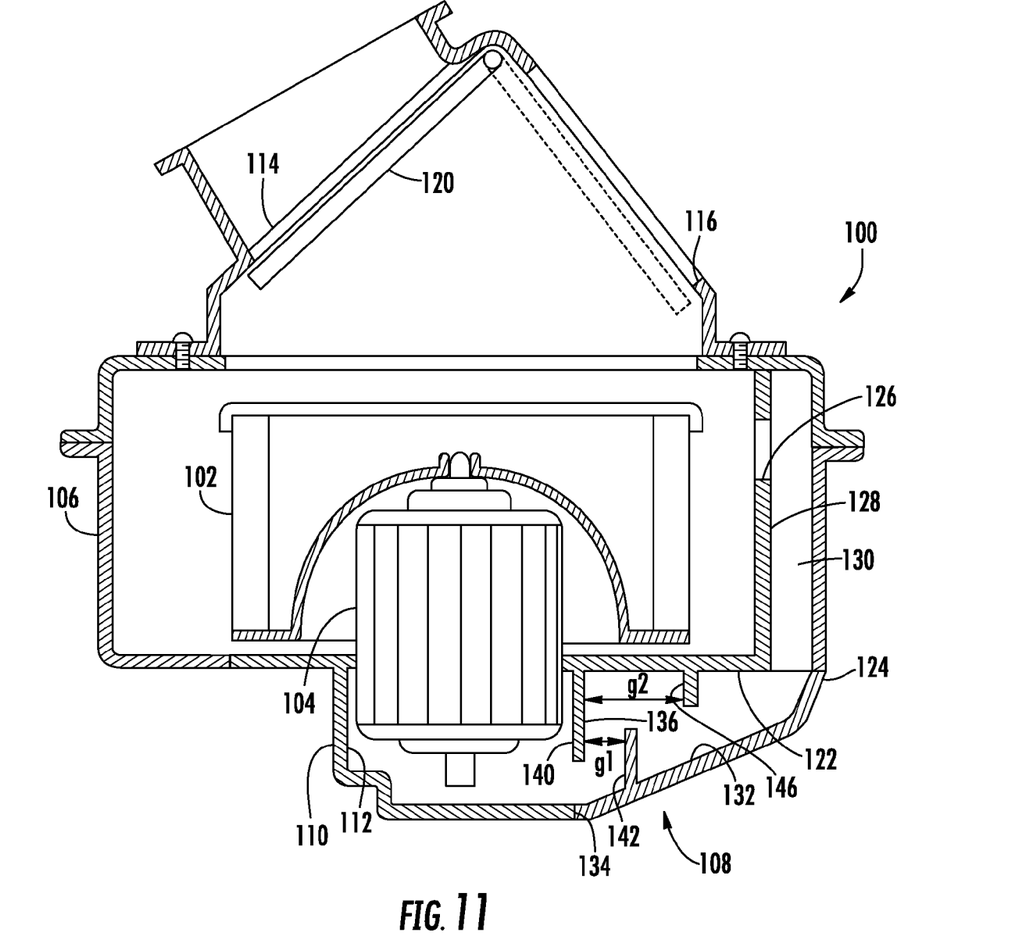
FIG. 11 is a cross sectional view of a blower unit for a vehicle according to a fourth embodiment of the present teachings.

FIG. 11 is a cross sectional view of a blower unit 100 for a vehicle according to a fourth embodiment of the present teachings. In this fourth embodiment, the second flat surface 142 protrudes from the slope 132 of the cooling path 108, and the third flat surface 146 protrudes from the bottom surface 122 of the scroll case 106. In this embodiment, the second gap g2 is defined between the first flat surface 136 and the third flat surface 146. The second gap g2 is larger than the first gap g1.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A blower unit for a vehicle comprising:
    a fan configured to generate airflow;
    a motor connected to the fan;
    a scroll case accommodating the fan;
    a cooling path connected to the scroll case, the cooling path guiding a part of the airflow from the fan to the motor;
    a first surface accommodated in the cooling path, the first surface being generally perpendicular to the part of the airflow directed to the motor; and
    a second surface accommodated in the cooling path, the second surface being substantially parallel to the first surface; wherein
    the first surface and the second surface at least partially overlap each other in a direction of the airflow directed to the motor, the first and second surfaces defining a first gap therebetween; and
    a dimension of the first gap is set dependent on a frequency of a noise created by the motor, the dimension of the first gap is determined as follows: $f=n*c/(4L)$ where "f" is the frequency of the noise, n is an integer "c" is velocity of sound, and "L" is the dimension of the first gap.

2. The blower unit for a vehicle according to claim 1, wherein the cooling path is built-in to an outer peripheral portion of the scroll case.

3. The blower unit for a vehicle according to claim 2, wherein said motor is accommodated in a motor housing, and said first surface forms a part of the motor housing.

4. The blower unit for a vehicle according to claim 3, further comprising a curved surface provided on an opposite side of the first surface, wherein the motor housing defines an inner cylindrical surface, and the curved surface corresponds to the inner cylindrical surface.

5. The blower unit for a vehicle according to claim 3, wherein the cooling path defines a slope declining from an outer peripheral portion of the scroll case to an edge of the motor housing.

6. The blower unit for a vehicle according to claim 5, wherein the second surface protrudes from the slope into said cooling path.

7. The blower unit for a vehicle according to claim 1, wherein the cooling path defines a slope declining from an outer peripheral portion of the scroll case to the motor.

8. The blower unit for a vehicle according to claim 1, wherein a third surface is accommodated in the cooling path, the third surface being substantially parallel to the second surface.

9. The blower unit for a vehicle according to claim 8, wherein the second surface and the third surface at least partially overlap each other in a direction of the air flow directed to the motor, the second and the third surfaces defining a second gap therebetween.

10. A blower unit for a vehicle comprising:
a fan configured to generate airflow;
a motor connected to the fan;
a scroll case accommodating the fan;
a cooling path connected to the scroll case, the cooling path guiding a part of the airflow from the fan to the motor;
a first surface accommodated in the cooling path, the first surface being generally perpendicular to the part of the airflow directed to the motor; and
a second surface accommodated in the cooling path, the second surface being substantially parallel to the first surface; and
a third surface accommodated in the cooling path, the third surface being substantially parallel to the second surface;
wherein:
the first surface and the second surface at least partially overlap each other in a direction of the airflow directed to the motor, the first and second surfaces defining a first gap therebetween;
the second surface and the third surface overlap with each other, and define a second gap therebetween; and
the first gap and the second gap have different lengths.

11. The blower unit for a vehicle according to claim 10, wherein the first gap is larger than the second gap.

12. The blower unit for a vehicle according to claim 10, wherein the first, second, and third surfaces are flat surfaces.

13. A blower unit for a vehicle comprising:
a fan configured to generate airflow;
a motor connected to the fan;
a scroll case accommodating the fan;
a cooling path connected to the scroll case, the cooling path guiding a part of the airflow from the fan to the motor;
a first surface accommodated in the cooling path, the first surface being generally perpendicular to the part of the airflow directed to the motor; and
a second surface accommodated in the cooling path, the second surface being substantially parallel to the first surface; wherein
the first surface and the second surface at least partially overlap each other in a direction of the airflow directed to the motor, the first and second surfaces defining a first gap therebetween; and
the first and second surfaces are flat surfaces.

14. A blower unit for a vehicle comprising:
a fan configured to generate airflow;
a motor connected to the fan;
a scroll case accommodating the fan;
a cooling chamber connected to the scroll case and defining a cooling path for guiding airflow from the fan to the motor;
a first partition arranged in the cooling path; and
a second partition arranged in the cooling path spaced apart from the first partition to define a gap; wherein
a dimension of the gap is set dependent on a frequency of a noise created by the motor, the dimension of the first gap is determined as follows: $f=n*c/(4L)$ where "f" is the frequency of the noise, n is an integer "c" is velocity of sound, and "L" is the dimension of the first gap.

15. The blower unit of claim 14, wherein the first partition is closer to the motor than the second partition.

16. The blower unit of claim 14, wherein the first partition includes a first surface facing the motor and a second surface facing the second partition, the first surface is curved and the second surface is planar.

17. The blower unit of claim 16, wherein the second partition includes a planar surface that extends parallel to the second surface of the first partition.

18. The blower unit of claim 14, wherein the first partition is integral with the scroll case.

19. The blower unit of claim 14, further comprising a third partition spaced apart from the second partition on a side of the second partition opposite to the first partition.

20. A blower unit for a vehicle comprising:
a fan configured to generate airflow;
a motor connected to the fan and seated within a motor housing;
a scroll case accommodating the fan;
a cooling chamber connected to the scroll case and defining a cooling path for guiding airflow from the fan to the motor;
a sloped surface of the cooling chamber that extends between an outer peripheral portion of the scroll case to an edge of the motor housing;
a first partition arranged in the cooling path and extending from the scroll case; and
a second partition arranged in the cooling path spaced apart from the first partition to define a gap, the second partition extending from one of the scroll case or the sloped surface; wherein
a dimension of the gap is set dependent on a frequency of a noise created by the motor, the dimension of the first gap is determined as follows: $f=n*c/(4L)$ where "f" is the frequency of the noise, n is an integer "c" is velocity of sound, and "L" is the dimension of the first gap.

21. The blower unit of claim 20, wherein the motor housing includes the first partition.

22. The blower unit of claim 20, further comprising a third partition arranged in the cooling path and extending from one of the scroll case or the sloped surface, the third partition is spaced apart from the second partition, and the second partition is between the first partition and the third partition.

23. A blower unit for a vehicle comprising:
a fan configured to generate airflow;
a motor connected to the fan;
a scroll case accommodating the fan;
a cooling path connected to the scroll case, the cooling path guiding a part of the airflow from the fan to the motor;
a first surface accommodated in the cooling path, the first surface being generally perpendicular to the part of the airflow directed to the motor; and a second surface accommodated in the cooling path, the second surface being substantially parallel to the first surface;

wherein:
the first surface and the second surface at least partially overlap each other in a direction of the airflow directed to the motor, the first and second surfaces defining a first gap therebetween;

a dimension of the first gap is set dependent on a frequency of a noise created by the motor;

a third surface is accommodated in the cooling path, the third surface being substantially parallel to the second surface; and the second surface and the third surface at least partially overlap each other in a direction of the air flow directed to the motor, the second and the third surfaces defining a second gap therebetween.

* * * * *